UNITED STATES PATENT OFFICE.

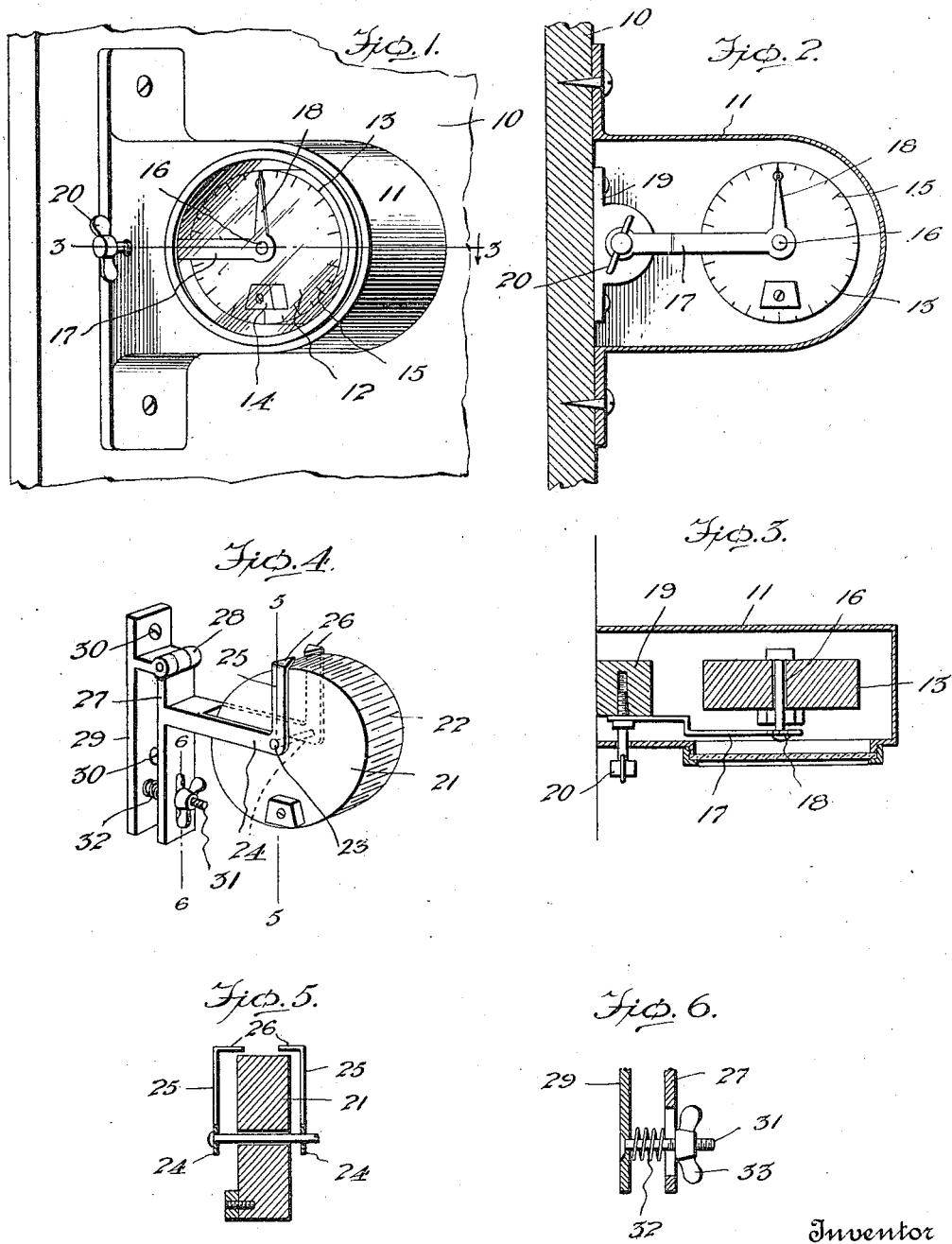

LESTER C. BARKER, OF DENVER, COLORADO.

GRADOMETER.

1,260,126.  Specification of Letters Patent.  Patented Mar. 19, 1918.

Application filed September 12, 1917. Serial No. 191,015.

*To all whom it may concern:*

Be it known that I, LESTER C. BARKER, a citizen of the United States, residing at Denver, in the county of Denver and State of Colorado, have invented new and useful Improvements in Gradometers, of which the following is a specification.

This invention relates to an attachment for automobiles and is designed to indicate the grades over which the machine travels.

In carrying out my invention it is my purpose to produce a gradometer which shall be of an extremely simple construction, and can be readily attached to the dash-board or other convenient part of the machine, in such position as is readily perceptible to the driver or occupants of the machine.

It is still a further object of the invention to produce a device of this character which, while of an extremely simple nature, is cheap to manufacture and readily installed, and will perform the functions for which it is devised with ease and with accuracy.

Other objects and advantages will present themselves as the nature of the invention is more fully understood, reference being had to the accompanying drawing, in which:—

Figure 1 is a detail fragmentary perspective view of a portion of an automobile having my improved arrangement thereon.

Fig. 2 is a vertically longitudinal sectional view through the casing inclosing the improvement.

Fig. 3 is a detail sectional view approximately on the line 3—3 of Fig. 1.

Fig. 4 is a perspective view illustrating a modification, the casing being removed.

Fig. 5 is a sectional view approximately on the line 5—5 of Fig. 4.

Fig. 6 is a sectional view approximately on the line 6—6 of Fig. 4.

Referring now to the drawings in detail the numeral 10 designates a dash or any other convenient portion of an automobile or similar self-propelled vehicle to which is attached my improvement. As disclosed in Fig. 1 of the drawings the improvement is arranged in a suitable casing 11 and provided with an opening which is closed by a transparent plate 12, and through this plate graduations upon the disk 13 of the gradometer are designed to be observed. The disk 13 may comprise a hollow cylindrical member or may be in the nature of a flat round member which is weighted at one of its ends as indicated by the numeral 14. The disk 13 is provided with graduations 15, indicating the degree of a circle, and the said disk is centrally provided with a round opening through which passes a shaft 16. This shaft has a loose bearing in an arm 17 the upper end of said arm being offset and arranged at an angle to provide a finger or pointer 18. The arm has its free end secured to a suitable bracket 19 arranged in the casing 11, or, if desired secured directly to the dash 10 of the vehicle. The connecting element between the arm 17 and the bracket 19 is in the nature of an adjusting element, such as a winged bolt 20. By placing the arm 17 horizontally and by screwing the said bolt in a suitable threaded orifice in the side of the bracket 19 to compress the arm 17 against the said bracket, the pointer 18 may be properly arranged at the zero mark on the disk 13, and so it will be noted that the grades over which the vehicle travels may be correctly determined regardless of the fact that the dash is not sustained perfectly vertical with respect to the body of the vehicle.

In Figs. 4 and 5 of the drawings I have illustrated a slight modification, the disk 21 being weighted at one of its edges and having its rim provided with graduation marks 22. Passing centrally through the disk 21 is a shaft 23 which has its ends secured to arms 24, and upon the ends of the arms, opposite their connection with the shaft arranged vertically are extensions 25 having their upper ends provided with angularly disposed pointers or hands 26, the said hands being arranged over the rim or periphery of the disk 21. The arms have their inner ends secured to or integrally formed with a plate 27 extending in opposite directions from the said arms and said plate 27 has one of its ends hingedly connected, as at 28, to an angular boss upon a plate or bracket 29. The plate 29, above the hinged connection with the bracket 29 is secured, as at 30 to the dash of the vehicle, the plate having its opposite ends provided with a laterally extending threaded stud 31 which passes through a suitable opening in the bracket 27. Upon the stud, and between the bracket and the plate is arranged a helical spring 32, while upon the upper end of the stud is screwed a winged nut 33. By this arrangement it will be noted that the pointers may be properly arranged over the zero mark on the disk when the vehicle is on a level.

The device above described is designed to be received in a suitable casing, not shown, and from the foregoing description, taken in connection with the drawings, the simplicity and advantages of the construction will it is thought be apparent without further detail description.

What is claimed is:—

1. In a gradometer for vehicles, an eccentrically weighted graduated disk, a pointer for the graduations of the disk, a shaft for the disk, an arm in which the shaft is journaled, said arm connected with the pointer, and means for adjustably securing the arm to a support.

2. In a gradometer for vehicles, a graduated disk which is weighted at one of its ends, a shaft passing centrally through the disk, an arm providing a bearing for the shaft and having an angular extension providing a pointer, a bracket secured to the vehicle, and means between the arm and bracket for adjustably connecting the said arm to the said bracket.

3. In a gradometer for vehicles, an eccentrically weighted disk having peripheral graduations, a shaft passing centrally through the disk, an arm having an opening providing a bearing for said shaft, an angular element upon the arm providing a pointer for the graduations of the disk, a supporting element, a pivotal connection between said supporting element and said arm, and means associated with said supporting element designed to hold the arm at a desired angle in respect to the supporting element.

In testimony whereof I affix my signature.

LESTER C. BARKER.

Copies of this patent may be obtained for five cents each, by addressing the "Commissioner of Patents, Washington, D. C."